Patented Oct. 6, 1953

2,654,736

UNITED STATES PATENT OFFICE 2,654,736

STABILIZED STARCH DERIVATIVES

Carlyle G. Caldwell, Forest Hills, and Otto B. Wurzburg, Babylon, N. Y., assignors to National Starch Products Inc., New York, N. Y., a corporation of Delaware No Drawing. Application February 2, 1949,
Serial No. 74,235

12 Claims. (Cl. 260—233.5)

This invention relates to a method for treating starch. Our prime object is to produce a starch product of improved stability; that is, one whose aqueous dispersions will maintain a relatively constant viscosity and clarity for appreciable periods of time, as compared to the rapid thickening or gelling and loss of clarity of the corresponding untreated starches under similar conditions.

We have discovered that the starch derivatives formed by the treatment of starch with the inner esters of beta-hydroxy aliphatic acids (also known as beta-lactones) are characterized by remarkably improved stability.

We use the term "starch" to include any of the natural starches such as are found, for example, in corn, potato, tapioca, sago, waxey maize, rice, wheat or sweet potato, and we also specifically include in this term the various modifications and conversion products of starch ordinarily referred to in the trade as thin-boiling or fluidity starches, dextrines and British gums, as well as the other starch derivatives such as starch esters, ethers and the like. The only requirement is that there be present hydroxyl groups to react with the beta-hydroxy aliphatic acid.

The tendency of aqueous starch dispersions to thicken or gel and become cloudy upon aging, has been a real disadvantage in many commercial operations. Corn starch, for example, when cooked in approximately 10 to 15 parts of water, quickly changes, upon cooling, from a clear fluid to an opaque, solid gel. Root starches, such as tapioca, while not gelling under the same circumstances to the extent that corn starch does, nevertheless frequently exhibit an objectionable thickening and pasting upon aging, this tendency being particularly marked in the case of the converted root starches such as British gums, white dextrines and the like.

In many large-scale commercial uses of starch products, the quality of stability, as herein defined, is of the utmost importance. Thus, starch products are among the chief base materials in the compounding of commercial adhesives. In modern manufacturing methods, adhesives are frequently applied to the objects to be adhered, by means of high-speed machines, and here the property of stability is of critical importance. The mechanics of gluing machines ordinarily include a revolving roll in contact with the adhesive, this roll being adjacent to and in contact with another revolving roll known as a transfer roll. The first roll picks up adhesive from the glue pot, thereby coating the transfer roll with an adhesive film of predetermined thickness; the transfer roll in turn applying the adhesive to the objects to be adhered. Any substantial change in the viscosity of the adhesive while in the machine will affect the thickness of the film formed on the rolls and thus the quality of the actual adhesion; in extreme cases the adhesive may thicken in the glue pots to a point where the rolls fail to pick it up at all. Thus, it is seen that a fluid adhesive of a given viscosity may perform excellently on a machine, whereas any substantial thickening of the adhesive would utterly ruin its usefulness.

Merely by way of another illustration, one might also point to the use of starch dispersions in the textile industry, for sizing and finishing operations. Here too, stability is of great importance, since any appreciable thickening of the dispersion will interfere with its ability to penetrate the thread or fabric properly. In extreme cases, thickening of the starch dispersion actually retards or prevents the flow of the dispersion in the pipe lines leading from the starch-cooking vessels to the points where the sizing or finishing operation takes place.

Other industrial applications where stability of starch dispersions is of critical importance will be apparent to those in the arts.

Hitherto, attempts to improve the stability of starch dispersions have often involved the addition to the dispersions of extraneous materials, such as peptizing salts and the like. The presence of extraneous chemicals in such formulations is frequently undesirable, since the properties of the final product are often adversely affected. Starches have also been treated chemically with a view toward improving their stability. Here too, the results have not been satisfactory, as compared to the product and process of our present invention. Previously known stabilizing treatments for starches have ordinarily involved relatively complex, and therefore expensive, processes. Furthermore, the resultant products were frequently changed in viscosity; that is, an aqueous dispersion of the treated starch was different in viscosity from an aqueous dispersion, prepared under the same conditions, of the corresponding untreated starch. Even more serious is the fact that the adhesive power of starch products, stabilized by hitherto known methods, was frequently weakened substantially.

By the relatively simple method of our present invention, starch and starch derivatives are stabilized by means of an actual chemical change in the starch structure itself, without the necessity for the presence of any extraneous stabilizing materials in the subsequent formulations.

We have discovered that remarkably improved properties of stability are imparted to starch and starch derivatives by permitting them to react with the inner esters of beta-hydroxy aliphatic acids, such as, for example, beta-propio-lactone, beta-butyro-lactone, beta-isobutyro-lactone, beta-valero-lactone and beta-isovalero lactone. Such treated starch and starch derivatives form aqueous dispersions of substantially the same viscosity as dispersions similarly prepared from the corresponding untreated starch or derivatives. The dispersions of our products retain their original viscosity and clarity for far greater periods of time than do similar dispersions of the corresponding untreated starch. Such dispersions of the treated starch need contain no extraneous stabilizing chemicals. The treated starch is not perceptibly weaker in adhesive power than the corresponding untreated starch.

The mechanics of the reaction are very simple, and the procedural details, as well as the proportions of reagent, are subject to wide variation. It is desirable that at least some moisture be present during the reaction—say, a minimum of approximately 10%, based on the dry starch weight. Thus, the starch or starch derivative may be suspended or dispersed in water. If raw, ungelatinized starch is used, it will be in the form of an aqueous suspension. If the starch suspension is heated beyond the gelatinization point of the starch, a dispersion results. Some modifications or derivatives of starch form dispersions in water without the necessity of preliminary heating. To the suspension or dispersion we add, with agitation, the inner ester of a beta-hydroxy aliphatic acid (hereafter alternatively referred to as "the reagent"). The proportion of the reagent used may be varied over a very wide range, depending entirely upon the degree of substitution desired in the starch molecule. Thus, the use of as little as 0.1% of beta-propio-lactone, based on the weight of the dry starch, has resulted in a product of measurably improved stability. On the other hand, we have employed quantities in the proportion of 300% and higher, and have obtained thereby a great improvement instability. We have further noted that when high degrees of substitution are obtained, through the use of large proportions of reagent, the resultant product has acquired the property of absorbing, and swelling in, alcohols and other media containing hydroxyl groups, such as glycerine and glycols.

The reaction may take place under alkaline, neutral or acid conditions. Under alkaline reaction conditions, the nature of the chemical linkage between the beta-lactone and the starch differs from that which occurs when the reaction conditions are neutral or acid.

Under alkaline reaction conditions there is formed a starch ester of the beta-hydroxy aliphatic acid. Under neutral or acid conditions the starch ether, rather than the ester, is formed.

The structure of the inner ester of beta-hydroxy aliphatic acid (beta-lactone) may be diagrammatically represented as follows:

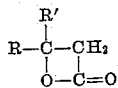

where R′ is hydrogen and where R may be either hydrogen (in the case of the propio-lactone) or CH₃ (in the case of the butyro-lactone) or other aliphatic radical.

Under alkaline reaction conditions the lactone reacts with hydroxyl groups of the starch to form an ester corresponding to the following formula:

Under neutral or acid conditions the lactone reacts with the hydroxy groups of the starch to form an ether linkage, as follows:

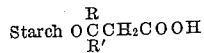

It has sometimes been found that the lactone, instead of reacting directly with the starch hydroxyl groups will, rather, combine with that portion of the lactone which has already been linked to the starch. In other words, as lactone is added to the starch, some of it may react with the substituent group rather than the hydroxyl group of the starch molecule. The result, in such cases, is the ether or ester of starch with a poly beta-hydroxy aliphatic acid.

Structurally, such an ester may be represented as follows:

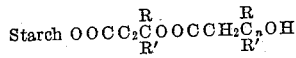

The ether may be represented as follows:

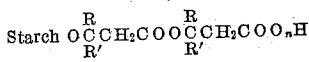

The value of $n$ may range from zero (where no formation of the poly-acid has taken place) to an upper figure (probably less than 10), depending entirely upon the amount of such combination among the lactone groups.

Whenever we speak, either in the specification or the claims, of the starch ester or the starch ether of a beta-hydroxy aliphatic acid, it must, therefore, be remembered that we include in that term ester or ether of the poly beta-hydroxy aliphatic acid.

For many purposes, we prefer that the starch suspension or dispersion be alkaline when the reagent is added. When relatively small proportions of reagent are to be used, we find it desirable to dissolve an alkaline material (such as sodium hydroxide, potassium hydroxide, trisodium phosphate, ammonium hydroxide or organic base such as tetra ethanol ammonium hydroxide) in water; thereupon suspending the starch in this alkali solution (the amount of alkali preferably being within the range 0.1% to 3%, based on the dry weight of the starch), and then adding the reagent. When large proportions of reagent are to be used, say more than 10%, based on the starch, we prefer to add the alkali (in the form of an aqueous solution) and the reagent to the suspension or dispersion, at intervals, in small portions; the aim being to maintain the pH of the reaction mass at about 10 throughout the process.

As has already been explained, the reaction may also be carried out in the absence of any alkaline material or even under acid conditions.

We find that the reaction proceeds efficiently at room temperatures, although it is sometimes more convenient to operate in the presence of heat as, for example, when the reagent is added to a starch which has just been dispersed by cooking in water.

With reference to the amount of water needed, we find it desirable to have at least 10% moisture, based on the starch. In other words, the reaction may take place upon ordinary commercial air-dry starch (which normally contains at least this amount of water). This may be accomplished, for example, by suspending starch in water preferably containing about 1% sodium hydroxide or similar alkali (based on the dry starch), filtering the starch without washing, then drying to a moisture content of not less than 10%, and spraying the reagent (say, 5 to 10%) into the agitated starch. By another variation, a finely powdered alkaline material, such as tri-sodium phosphate or sodium carbonate, may be intimately blended with untreated starch, followed by spraying the reagent into this blend, with agitation.

As to the maximum amount of water to be present, we do not find that there is any critical upper limit. However, when working with a suspension or dispersion of starch in water, we prefer to keep the amount of water as low as will permit of easy handling. Thus, we prefer that the ratio of water to starch shall not be substantially greater than 5 to 1. As the amount of water is increased, the added reagent will naturally be diluted and, also, apparently subject to a greater degree of hydrolysis. It should be emphasized, however, that even in the presence of far greater ratios of water, an appreciable reaction does take place between the starch and reagent, with the improvement in properties already described.

Depending upon the use to which the product is to be put, the treated starch, in suspension or dispersion, may be handled in various ways:

a. It may be used as is, without further purification or processing, with or without the addition of such other materials as may be desired for a given formulation.

b. If the starch is ungelatinized, and in a state of aqueous suspension, it may be filtered, washed with water, and dried.

c. A suspension or dispersion of the treated starch may be passed over heated revolving drums, or subjected to spray drying.

d. Starch dispersions may be poured into alcohol or other starch precipitants, and the resulting starch precipitate filtered and dried.

e. The treated starch may be subjected to such other reactions as are desired, as, for example, dextrinization, treatment with other modifying chemicals such as etherifying or esterifying reagents, or the like.

The following examples will further illustrate the embodiment of our invention:

Example I

This example illustrates the treatment of an ungelatinized thin-boiling corn starch, in aqueous suspension. All parts given in this and subsequent examples are by weight.

In a solution of 1.0 part sodium hydroxide in 125 parts water were suspended, with agitation, 100 parts of acid converted thin-boiling corn starchs known in the trade as 60 fluidity).

To this suspension were added 5 parts of beta-propiolactone (inner ester of beta-hydroxy propionic acid). Agitation was continued for 10 minutes, whereupon the starch product was filtered, washed with water and dried.

When 1 part of this product was cooked in 4 parts of water and then cooled, it formed a heavy, cohesive fluid. On aging overnight it remained fluid. For purposes of comparison, 1 part of the untreated acid fluidity corn starch was cooked in 4 parts of water. On cooling, it formed a gel which, after standing overnight, became a very hard, firm solid.

Example II

This example illustrates the treatment of tapioca British gum, in aqueous dispersion.

With constant agitation, 100 parts tapioca British gum, having a solubility of 100%, were cooked in 55 parts water at 190° F. for 20 minutes. At the end of this period, heating was discontinued and 2.4 parts of a 25% sodium hydroxide solution were added. Then there were added 5.0 parts beta-propio-lactone.

The product was used without further treatment or purification. After a period of about 2 weeks, it was still fluid, clear and stable, whereas a similar dispersion of the untreated tapioca British gum had become a solid, opaque paste.

Example III

This example illustrates the treatment of ungelatinized corn starch, in aqueous suspension.

0.4 part sodium hydroxide was dissolved in 125 parts water and 100 parts corn starch were suspended therein. There was then added, with agitation, 0.1 part beta-propio-lactone.

Agitation was continued for one-half hour. The pH was then adjusted to 6.5 and the starch product filtered, washed and dried.

The resulting product, when cooked in the ratio 1 part starch to 10 parts water, showed less tendency to gel on cooling and storage than the corresponding untreated starch dispersion.

Example IV

This example illustrates the treatment of ungelatinized thin-boiling potato starch, in aqueous suspension.

To a solution of 1.0 part sodium hydroxide in 125 parts water were added, with agitation, 100 parts thin-boiling potato starch (68 fluidity). 10 parts beta-propio-lactone were then added, and agitation continued for 1 hour. The starch product was then filtered, washed twice and dried.

The resulting product, when cooked and compared with the untreated starch, was considerably more stable, remaining much more fluid than the untreated starch which gelled on cooling and standing overnight.

Example V

This example illustrates the treatment of corn starch with a large proportion of beta-propio-lactone.

100 parts corn starch were suspended in 100 parts water, with constant agitation. The pH was raised to 10 with a 25% aqueous sodium hydroxide solution. Beta-propio-lactone was then added slowly, maintaining the pH of the starch suspension between 9 and 10 by frequent additions of alkali solution.

The additions were adjusted so that both the alkali and reagent were mixed in quickly and thoroughly, thus preventing any localized accumulation of caustic or propio-lactone.

This procedure was continued until a total of 300 parts of beta-propio-lactone had been added. Whenever necessary, water was added to maintain a workable consistency.

The resulting product was a crumbly white paste which was miscible in 1 to 2 parts of ethyl alcohol, absorbing the latter to form a semi-translucent, heavy paste. It also was compatible, in a similar manner, with organic fluids such as acetone, dimethyl formamide and lactic acid. A large excess of ethyl alcohol was found to precipitate the starch derivative which could then be recovered as a white powder.

*Example VI*

This example illustrates the treatment of air-dry corn starch.

A solution was made of 1 part sodium hydroxide in 125 parts water, and 100 parts ungelatinized corn starch were suspended therein. After a few minutes agitation, the starch was filtered, dried to a moisture of 10% to 15%, and powdered. There were then sprayed into this starch, agitating continuously, 10 parts beta-propio-lactone. Agitation was continued 12 hours.

Whether used without further purification, or whether purified by washing first with ethyl alcohol, then with water, the resulting starch product, when cooked in water, formed a dispersion of improved stability.

*Example VII*

This example illustrates the treatment of an aqueous suspension of wheat starch.

1 part potassium hydroxide was dissolved in 150 parts water and 100 parts wheat starch were suspended therein. There were then added 10 parts of beta-butyro-lactone (inner ester of beta-hydroxy butyric acid). After several hours agitation, the pH was adjusted to 6.5. The product was filtered, washed and dried.

The resultant starch product was characterized by improved stability.

*Example VIII*

This examples illustrates the treatment of ungelatinized corn starch, in aqueous suspension, under neutral conditions.

200 parts of corn starch were suspended in 300 parts water, and 20 parts of beta-propio-lactone were added, with agitation. Agitation was continued for 12 hours, whereupon the starch was filtered, washed and dried.

The resultant starch product was characterized by improved stability.

*Example IX*

This example illustrates the treatment of ungelatinized corn starch, in aqueous suspension, under acid conditions.

100 parts of corn starch were suspended in 150 parts of water. Sufficient hydrochloric acid was added to bring the pH of the suspension to 3.0. Thereupon, 15 parts of beta-propio-lactone were added, with agitation. Agitation was continued for 24 hours, whereupon the pH was adjusted to 6.0, the starch filtered, washed twice with water and dried.

The resultant starch product was characterized by improved stability.

The stabilized starch derivatives of our invention, depending upon individual circumstances and the use to which the products are to be put, may be marketed in their dry form or as aqueous suspensions or dispersions or as components of various formulations.

It is also sometimes desirable to market the product in the form of an anhydrous starch containing therein the beta-lactone reagent. This anhydrous starch-beta-lactone mixture may also contain a dry, powdered, alkaline material or the starch itself may have been pretreated in an alkaline suspension in the manner already described, and then dried to an anhydrous state prior to the addition of the beta-lactone. In any of these cases, the actual reaction between the starch and the beta-lactone takes place when the starch-beta-lactone product is eventually mixed with water.

We claim:

1. The method of making a starch derivative which consists in reacting starch in the presence of moisture with a beta-lactone.

2. The method of making a starch derivative which consists in reacting starch in the presence of moisture with the inner ester of a beta-hydroxy propionic acid.

3. The method of making a starch derivative which consists in reacting starch in the presence of moisture with the inner ester of a beta-hydroxy butyric acid.

4. The method of making a starch derivative which consists in adding a beta-lactone to an aqueous suspension or dispersion of starch.

5. The method of claim 4 wherein the pH of the starch suspension or dispersion is above 7.

6. The method of claim 4 wherein the pH of the starch suspension or dispersion is at or below 7.

7. The method of making a starch derivative which consists in blending air-dry starch containing at least 10% moisture, based upon the anhydrous weight of the starch, with a beta-lactone.

8. The method of claim 7 wherein the starch, prior to addition of the beta-lactone, has been suspended in a weak solution of a strong alkali, filtered without washing and then dried to a moisture content of not less than 10%.

9. The method of claim 7 wherein a finely powdered, alkaline material has been blended with the starch prior to addition of the beta-lactone.

10. A starch derivative comprising the reaction product of starch in the presence of moisture with a beta-lactone.

11. A starch derivative comprising the reaction product of starch in the presence of moisture with the inner ester of a beta-hydroxy propionic acid.

12. A starch derivative comprising the reaction product of starch in the presence of moisture with the inner ester of a beta-hydroxy butyric acid.

CARLYLE G. CALDWELL.
OTTO B. WURZBURG.

References Cited in the file of this patent

UNITED STATES PATENTS

| Number | Name | Date |
|---|---|---|
| 2,148,951 | Maxwell | Feb. 28, 1939 |
| 2,316,128 | Bock et al. | Apr. 6, 1943 |
| 2,316,129 | Bock et al. | Apr. 6, 1943 |
| 2,352,641 | Kung | July 4, 1944 |
| 2,399,455 | Treadway | Apr. 30, 1946 |
| 2,412,213 | Groen | Dec. 10, 1946 |
| 2,455,731 | Caldwell | Dec. 7, 1948 |
| 2,462,210 | Moe | Feb. 22, 1949 |
| 2,526,554 | Gresham et al. | Oct. 17, 1950 |

OTHER REFERENCES

Karrer Organic Chemistry, 2nd Ed., pages 250–1 (1946).

Chowdhury, Chem. Abs., vol. 19 (1925), page 640.

Gresham et al., JACS, vol. 70 (1948), pages 1004–1006.